Figure 3:
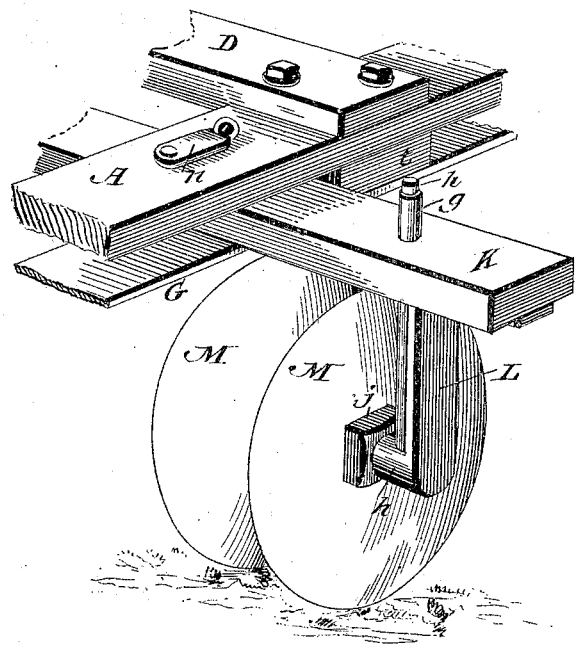

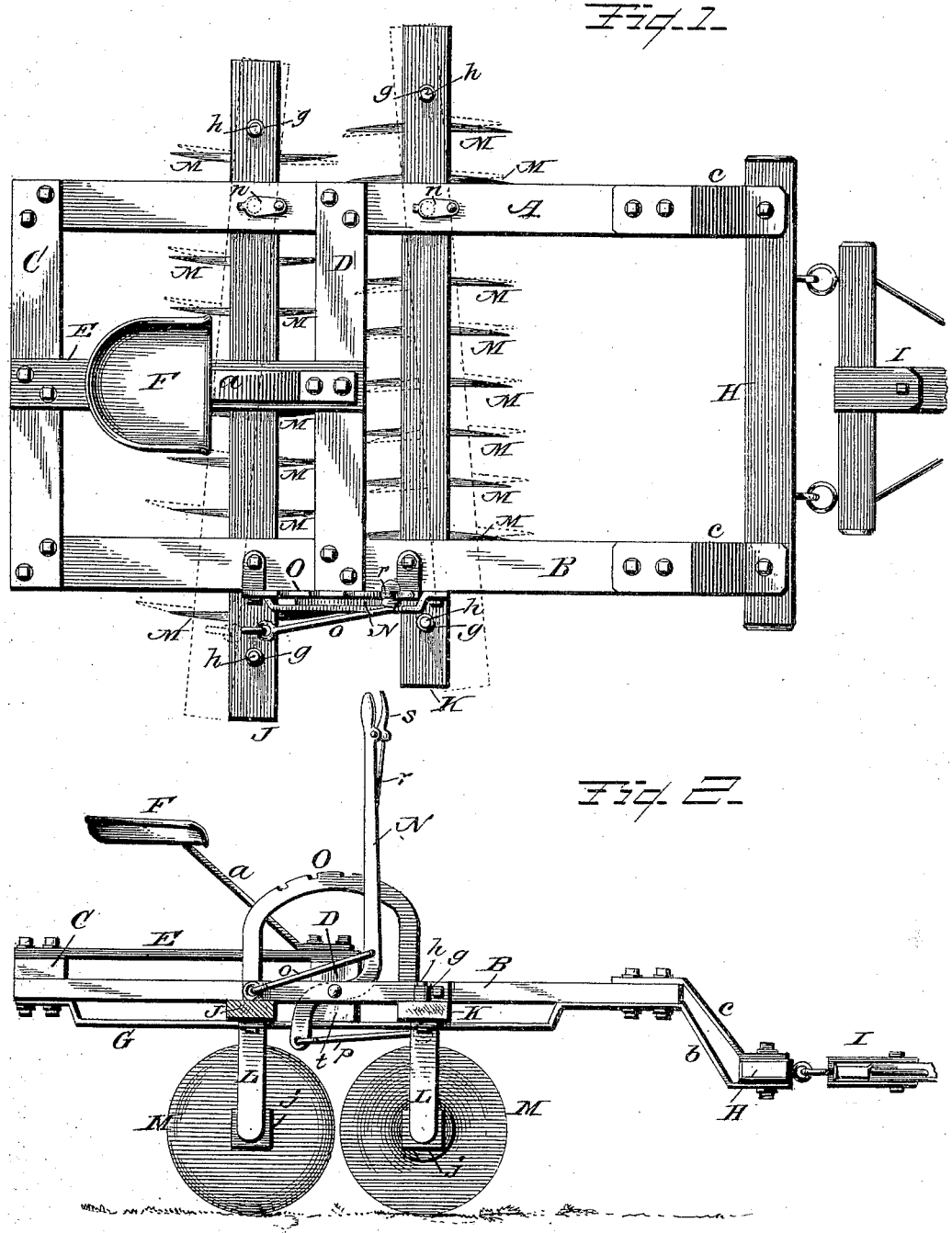

No. 687,944. Patented Dec. 3, 1901.
J. C. TALBOT.
DISK HARROW.
(Application filed Sept. 25, 1901.)
(No Model.) 2 Sheets—Sheet 2.

Witnesses
C. J. Williamson
Wm G. Goody

Inventor
Joseph C. Talbot,
per Chas. H. Fowler
Attorney

UNITED STATES PATENT OFFICE.

JOSEPH C. TALBOT, OF WALLA WALLA, WASHINGTON.

DISK HARROW.

SPECIFICATION forming part of Letters Patent No. 687,944, dated December 3, 1901.

Application filed September 25, 1901. Serial No. 76,478. (No model.)

*To all whom it may concern:*

Be it known that I, JOSEPH C. TALBOT, a citizen of the United States, residing at Walla Walla, in the county of Walla Walla and State of Washington, have invented certain new and useful Improvements in Disk Harrows; and I do hereby declare that the following is a full, clear, and exact description of the same, reference being had to the annexed drawings, making a part of this specification, and to the letters of reference marked thereon.

The present invention has relation to that class of disk harrows provided with a double row or two sections of pulverizing or cutting disks; and the object thereof is to improve such harrow in the several details of construction, whereby greater strength and durability are secured and a more perfect operation of the harrow-sections in cultivating the ground and catching all weeds that may be missed by the first set or section of disks, thus thoroughly cutting and pulverizing the ground and destroying all weeds.

The invention consists in a disk harrow constructed substantially as shown in the drawings and hereinafter described and claimed.

Figure 4:
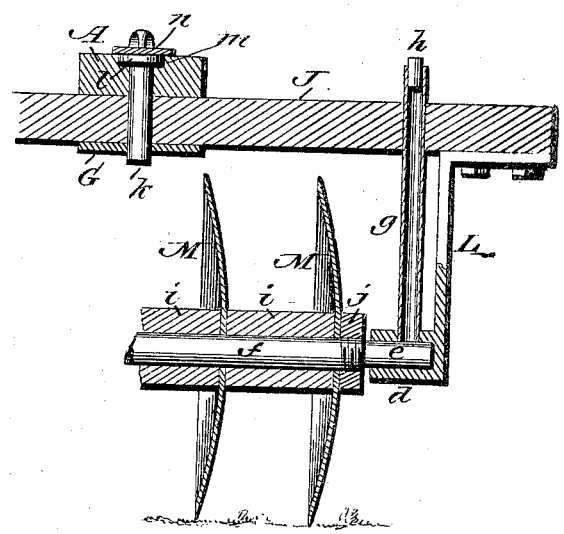

Figure 1 of the drawings is a top plan view of a harrow constructed in accordance with my invention, the dotted lines showing the angle to which the disk-sections may be brought; Fig. 2, a side elevation thereof, partly in section; Fig. 3, a detail perspective view of two of the disks, on an enlarged scale, with a portion of the harrow-frame and its connections; Fig. 4, a detail sectional view thereof.

In the accompanying drawings, A B represent two parallel bars, and C D the two cross-bars connected thereto, the cross-bar C connecting the rear ends of the parallel bars, the cross-bars being connected by the supporting-brace E, to which the spring *a* is connected, that supports the usual driver's seat F. The parallel and cross bars comprise the frame of the harrow; but any suitable frame may be substituted for that shown, and any suitable driver's seat and means for connecting it to the harrow-frame may be used, without departing from the principle of my invention. At the under side of the parallel bars A B are metal braces G, which braces are connected by suitable fastenings to the ends of the bars and to the underside thereof. These braces extend along the entire length of the parallel bars and are of such length as to extend some distance beyond the front ends of the bars and are bent down to form hangers *b*, to which is secured the draft-bar H. Similar hangers *c* are secured to the upper side and end of the parallel bars, and between these hangers the draft-bar is held and secured by bolts or other suitable fastenings, as shown in Fig. 2 of the drawings.

A draft-tongue of any preferred construction, as shown at I, is suitably connected to the draft-bar H, the form and construction of the tongue and the manner of attaching it to the draft-bar or harrow-frame being subject to many modifications or changes and being left entirely to the judgment of the user.

The metal braces G are not only designed as braces to strengthen the frame of the harrow, but also as guides, and therefore I shall term the same "guide-braces," as the double function of a brace and guide is secured. In order to serve the function of a guide, the brace is bent to extend down some distance to present a space between it and the under side of the bars A B, as shown in Fig. 2 of the drawings. These guide-braces G receive the ends of disk-beams J K, which are somewhat longer than the width of the harrow-frame, so that the ends of the disk-beam will extend beyond the sides of the harrow-frame. To the ends of the beams J K are connected suitable brackets L, which terminate at their lower ends in socket-bearings *d* to receive the projecting ends *e* of the axles *f*. Upright tubes *g* extend down through the disk-beams J K and engage the socket-bearings *d*, said tubes receiving the lubricant which is fed to the projecting ends *e* of the axle, the tubes being closed at their upper ends by removable stoppers *h*, as shown in Fig. 4 of the drawings.

The harrow-disks M are shown as concavo-convex in form; but the disks may be of any suitable shape and construction found best adapted to the purpose. The disks are held on the axle *f* the required distance apart by means of the tubular blocks *i* and the tightening-nut *j*, which nut engages the screw-threads upon the axle.

Any number of harrow-disks may be used and the distance between them increased or diminished by the employment of tubular blocks of different lengths, the blocks being readily removable from the axle and replaced by others of the required length.

The disk-beams J K are pivotally connected to one of the bars of the frame, preferably the bar A, as shown, although the disk-beams may be pivoted to any portion of the harrow-frame, depending entirely upon the kind of frame used.

The disk-beams J K are pivoted to the frame by means of removable pivot-pins $k$, which extend through the bar A, the disk-beams, and the guide-brace G, as shown in Fig. 4 of the drawings. The pivot-pins $k$ have heads $l$ at their upper ends, which are seated in mortises $m$ in the parallel bar A of the harrow-frame, and to hold said pins in place and prevent them from accidentally disengaging themselves there is provided a pivoted guard-plate $n$. This guard-plate extends over the head of the pin and holds it down in place, and when it is necessary for any reason to remove the pin the guard-plate may be swung around from over the head of the pin, which will admit of the pin being withdrawn. The pivoting of the disk-beams to the frame of the harrow, as herein described, admits of the two sets of harrow-disks being brought parallel to each other, as shown in full lines of Fig. 1 of the drawings, or at any desired angle to each other, as shown in dotted lines, thereby forcing the disks into the ground different depths, and the greater the angle from a parallel the deeper the disks will enter the ground. Any suitable means may be employed for changing the angle of the beams with relation to each other and holding them in their adjusted position, and I will show one of many devices that may be used to attain this end.

A suitable hand-lever is pivoted to the bar B of the harrow-frame, as shown at N, said lever having a double curve at its lower end, and above and below its pivotal connection are rods $o$ $p$, respectively, as shown in Fig. 2 of the drawings. These rods are connected to the lever and to the ends of the disk-beams J K in any suitable manner, and a notched arch O is secured to the harrow-frame, and a lever-rod $r$, with pawl, is pivotally connected to the hand-lever N through the medium of the hand-grasp $s$. In moving the hand-lever in either direction and releasing the hand-grasp of the lever-rod to allow the pawl thereon to engage the notch of the arch the disk-beams will be held at any position adjusted, either parallel with each other or at an angle, as found necessary.

In order to reinforce the guide-braces G, at or near their center, suitable stay-blocks may be used, as shown at $t$ in Figs. 2 and 3 of the drawings, or any means may be employed for this purpose.

It is evident that many changes or modifications may be made in the several details of construction without in any manner changing the character of the invention, and any such changes may be resorted to as would come within ordinary mechanical judgment without affecting the essential features of the invention.

Having now fully described my invention, what I claim as new, and desire to secure by Letters Patent, is—

1. A disk harrow comprising a suitable frame, beams pivoted at one end to the frame, suitable disks connecting with the beams, and suitable guide-brace extending the length of the frame and connected to the under side thereof, the ends of the beams extending between the frame and guide-braces, and suitable means for operating the beams to change the angle of the disks, substantially as and for the purpose set forth.

2. A disk harrow comprising a suitable frame, pivoted beams and disks connecting therewith, guide-braces connected to the frame by removable pivot-pins for pivotally connecting the beams to the frame, and pivoted guard-plates to extend over the head of the pins to hold them in engagement with the frame, beam and guide-brace, substantially as and for the purpose specified.

3. A disk harrow comprising a suitable frame, beams pivotally connected at one end to the frame, brackets depending from the ends of the beams and terminating in inwardly-extending socket-bearings, axles having projecting ends engaging the sockets in the bearings, disks upon the axles, removable blocks upon the axles and interposed between the disks, tightening-nuts engaging the screw-threads upon the axle, and guide-braces connected to the frame, and means for operating the disk-beams, substantially as and for the purpose described.

In testimony that I claim the above I have hereunto subscribed my name in the presence of two witnesses.

JOSEPH C. TALBOT.

Witnesses:
J. W. LANGDON,
CHAS. S. BUFFUM.